(12) United States Patent
Baba et al.

(10) Patent No.: US 8,267,591 B2
(45) Date of Patent: Sep. 18, 2012

(54) WHEEL BEARING SEAL AND A WHEEL BEARING APPARATUS PROVIDED WITH THE WHEEL BEARING SEAL

(75) Inventors: Tomoko Baba, Iwata (JP); Kazuo Komori, Iwata (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 13/177,596

(22) Filed: Jul. 7, 2011

(65) Prior Publication Data

US 2011/0262069 A1 Oct. 27, 2011

Related U.S. Application Data

(63) Continuation of application No. PCT/JP2010/000012, filed on Jan. 5, 2010.

(30) Foreign Application Priority Data

Jan. 7, 2009 (JP) .................................. 2009-001354

(51) Int. Cl.
*F16C 13/00* (2006.01)
*F16C 33/76* (2006.01)

(52) U.S. Cl. ........................................ 384/486; 384/544

(58) Field of Classification Search .................. 384/477, 384/484, 486, 544, 589, 448; 277/551, 560, 277/562, 572
See application file for complete search history.

(56) References Cited

U.S. PATENT DOCUMENTS

| | | | |
|---|---|---|---|
| 5,803,617 A | 9/1998 | Ohnuki et al. | |
| 6,953,193 B2 * | 10/2005 | Kanzaki | 277/562 |
| 6,979,001 B2 * | 12/2005 | Ohtsuki et al. | 384/448 |
| 2007/0081751 A1 | 4/2007 | Norimatsu et al. | |
| 2008/0044120 A1 | 2/2008 | Komori | |
| 2008/0265521 A1 * | 10/2008 | Mizuta et al. | 277/551 |
| 2009/0206553 A1 | 8/2009 | Kanzaki | |

FOREIGN PATENT DOCUMENTS

| | | |
|---|---|---|
| CN | 101208550 | 6/2008 |
| DE | 10 2006 047 0 | 4/2007 |
| EP | 1 898 132 | 3/2008 |
| GB | 2 310 467 | 8/1997 |
| JP | 09-287619 | 11/1997 |
| JP | 2003-148625 | 5/2003 |
| JP | 2003148626 A * | 5/2003 |
| JP | 2004-278619 | 10/2004 |
| JP | 2006-200616 | 8/2006 |

(Continued)

*Primary Examiner* — Thomas R Hannon
(74) *Attorney, Agent, or Firm* — Harness, Dickey & Pierce, P.L.C.

(57) ABSTRACT

A wheel bearing seal (7, 19, 20) has an annular sealing plate (10 or 21) and a slinger (11 or 11'). The sealing plate (10 or 21) has a metal core (12 or 22) and sealing member (13 or 23). The sealing member (13 or 23) has a first side lip (13a or 23a), a second side lip (13b or 23b), and a grease lip (13c or 23c). The slinger (11 or 11') has a cylindrical portion (11a or 11a') and an upstanding portion (11b, 11b'). The first and second side lips (13a or 23a and 13b or 23b) slidably contact the upstanding portion. The grease lip (13c or 23c) slidably contacts with the cylindrical portion (11a or 11a'). A relationship, $F1+F2 \leq 1.5 \times F3$, exists between contacting loads F1 and F2, respectively, of the first and second side lips (13a or 23a and 13b or 23b) and a fastening force F3 of the grease lip (13c or 23c).

18 Claims, 8 Drawing Sheets

FOREIGN PATENT DOCUMENTS

| | | |
|---|---|---|
| JP | 2007-009938 | 1/2007 |
| JP | 2007-211791 | 8/2007 |
| JP | 2008-128378 | 6/2008 |
| JP | 2008-261461 | 10/2008 |
| JP | 2008-261462 | 10/2008 |
| JP | 2008-261463 | 10/2008 |
| KR | 10-2008-0019724 | 3/2008 |
| WO | WO2006/077910 | 7/2006 |
| WO | WO2007/000861 | 1/2007 |
| WO | WO2008/136169 | 11/2008 |

* cited by examiner

[Fig 1]
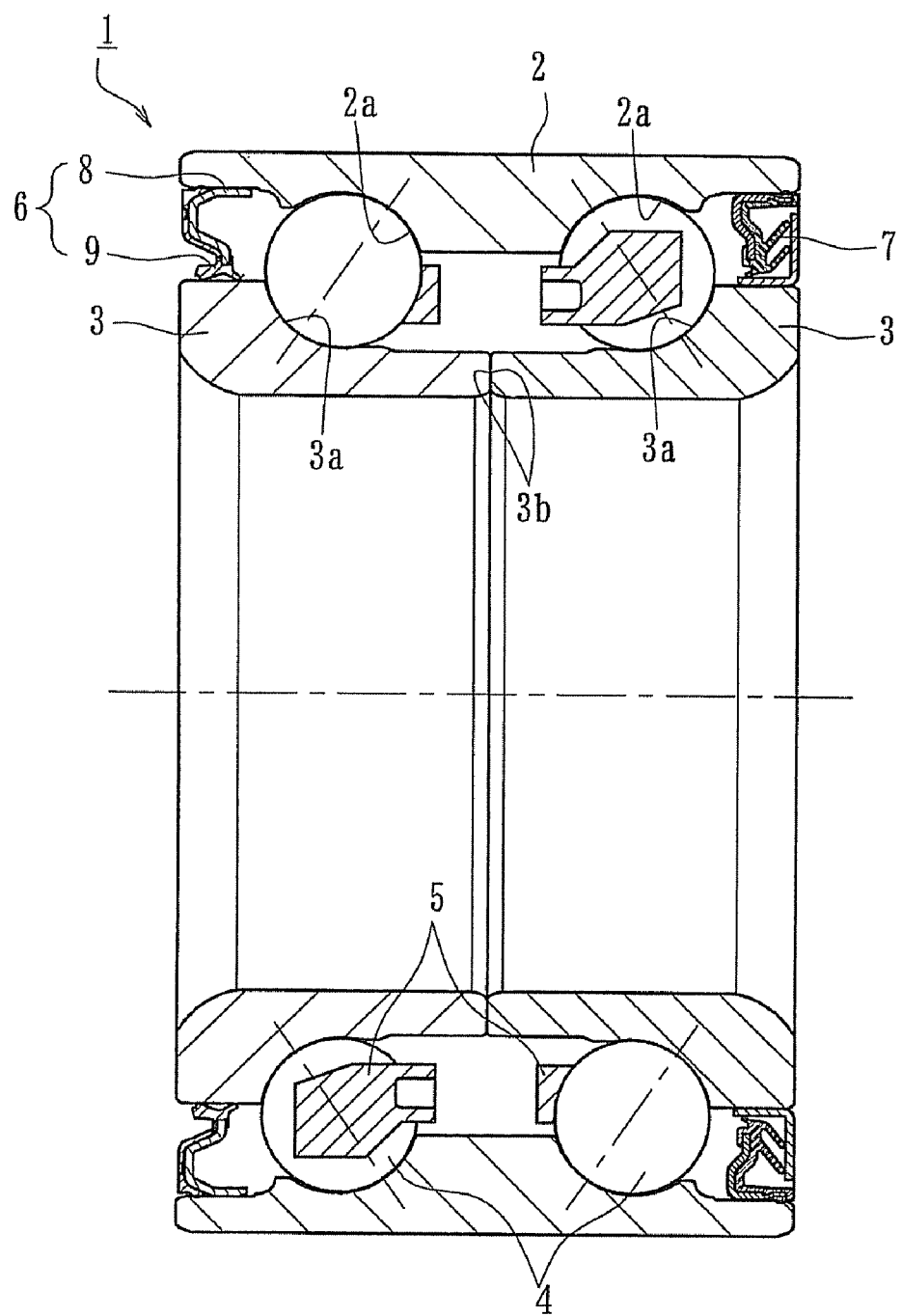

[Fig 2]
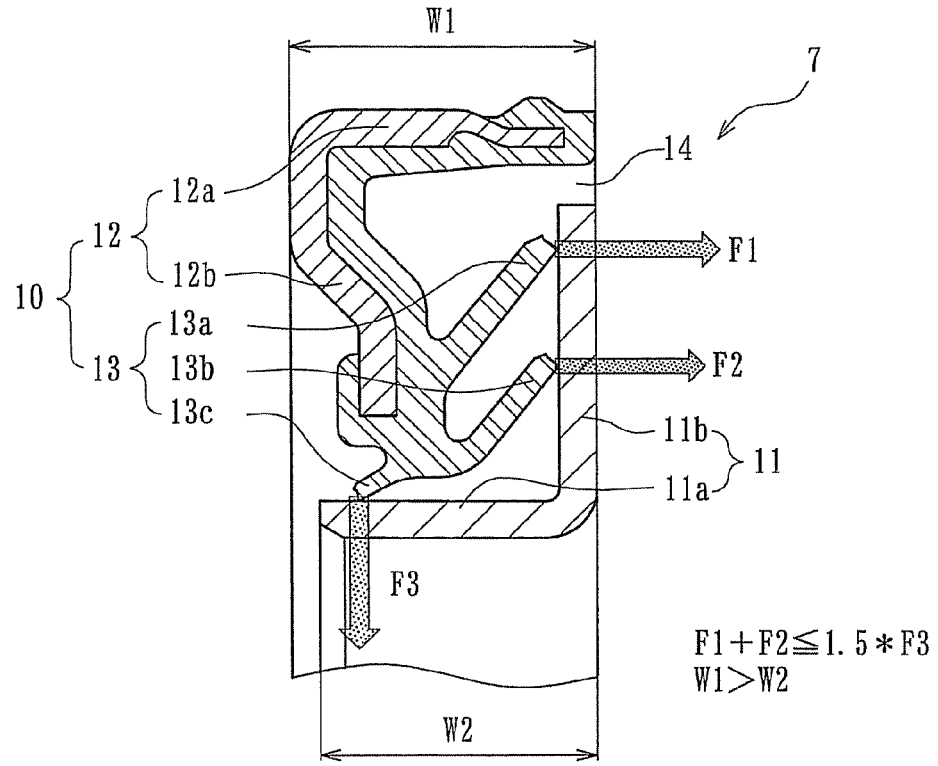
$F1+F2 \leqq 1.5 * F3$
$W1 > W2$
[Fig 3]
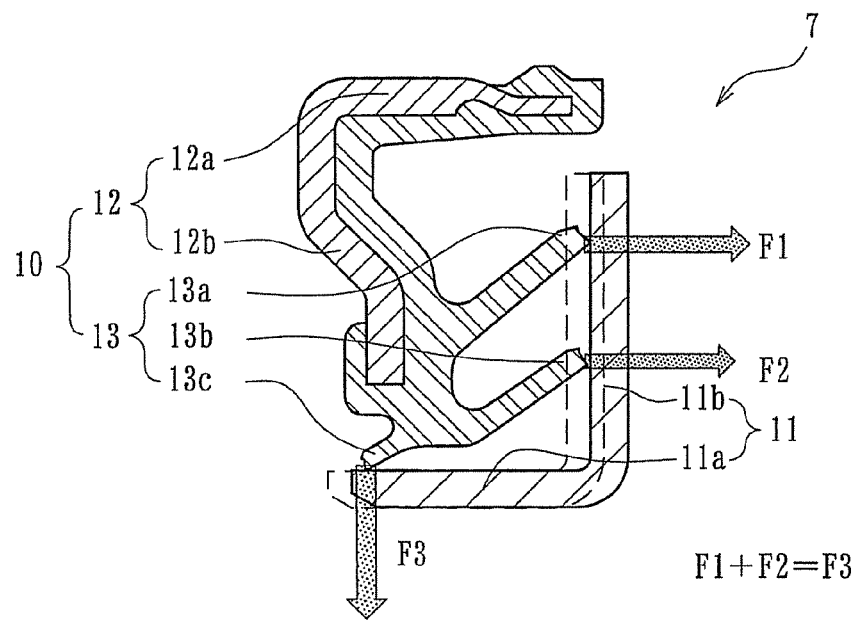
$F1+F2=F3$

[Fig 4]
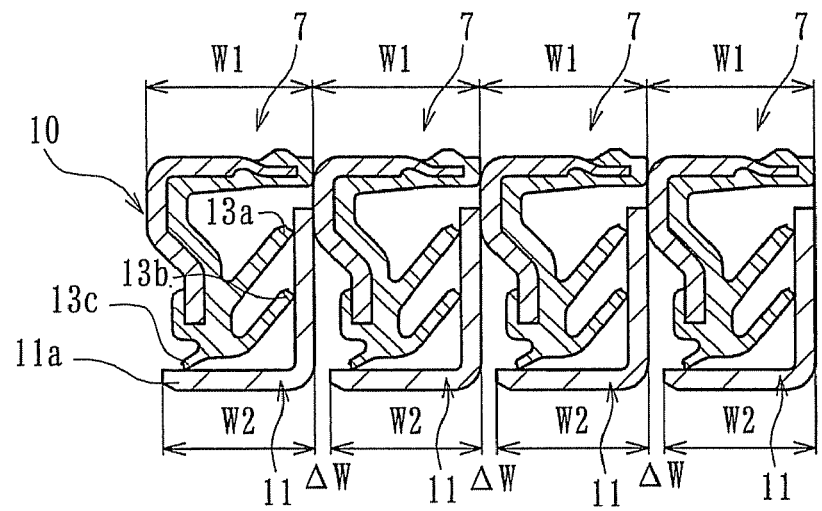
[Fig 5]
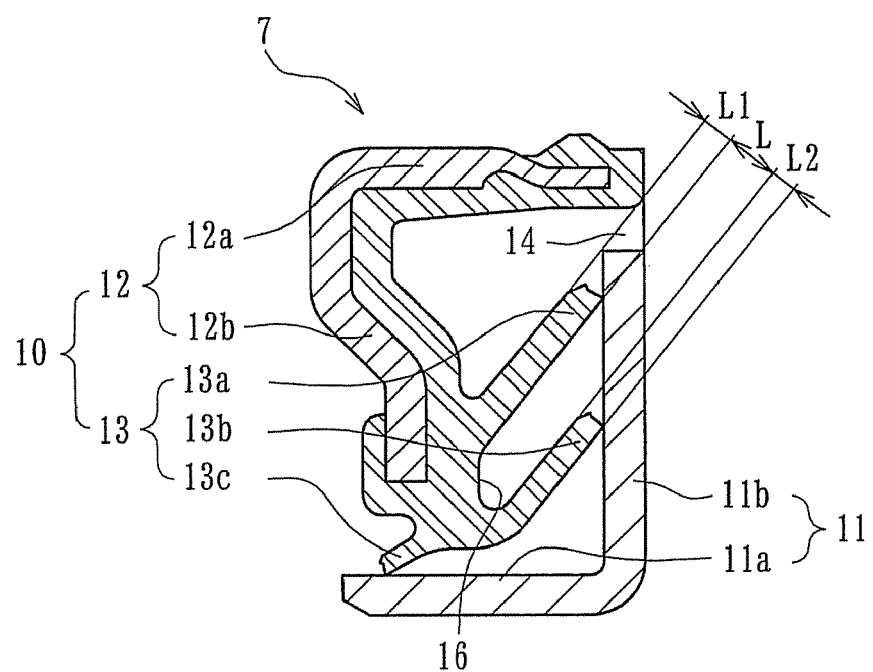

[Fig 6]
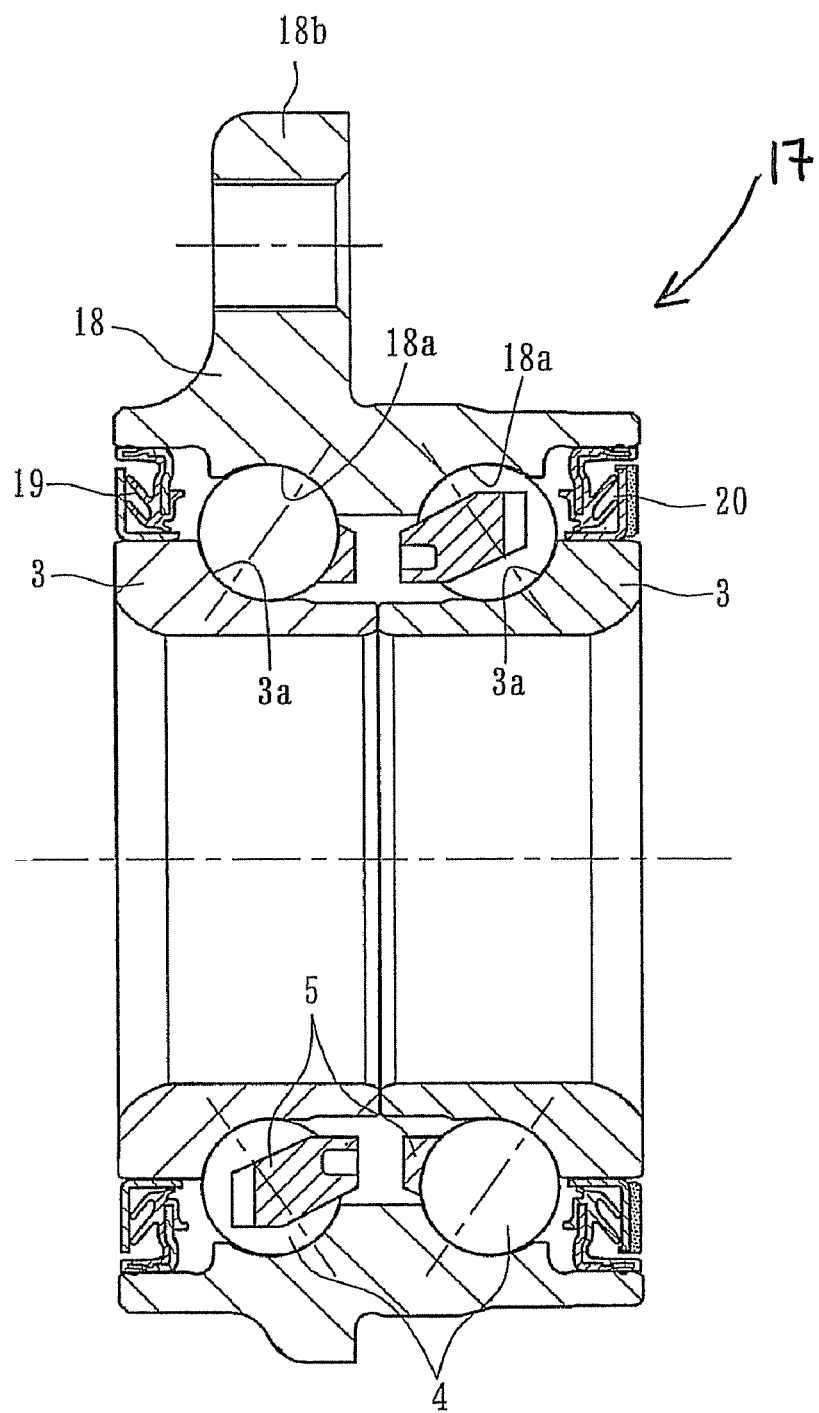

[Fig 7]
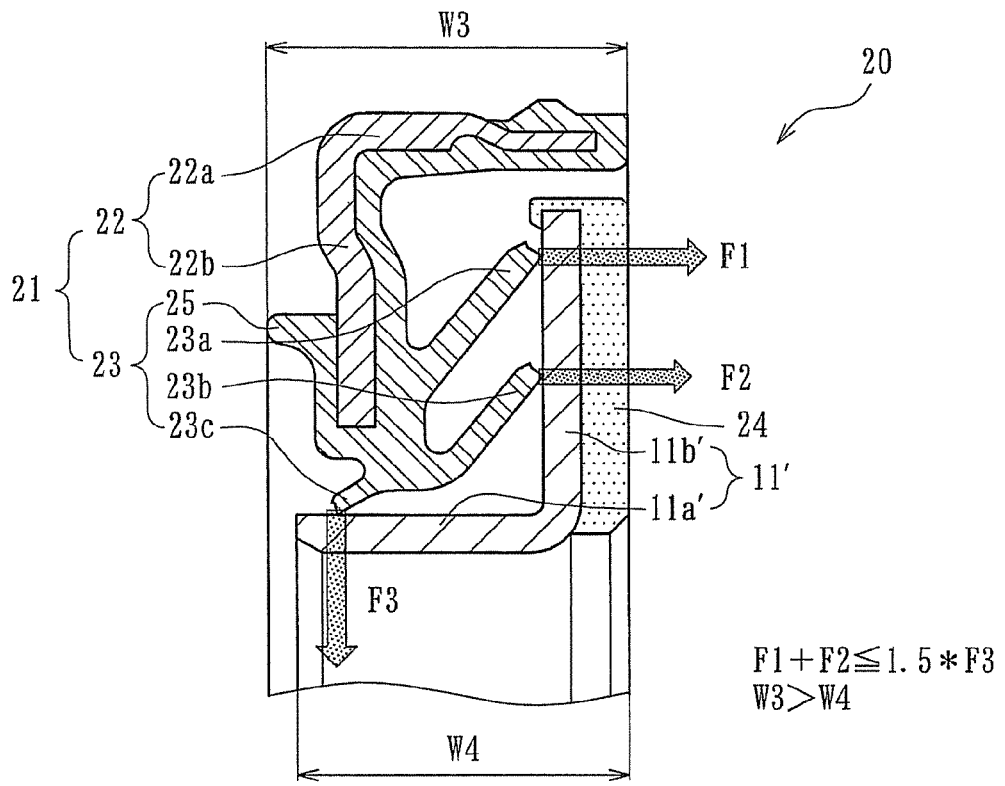
$F1+F2 \leq 1.5 * F3$
$W3 > W4$
[Fig 8]
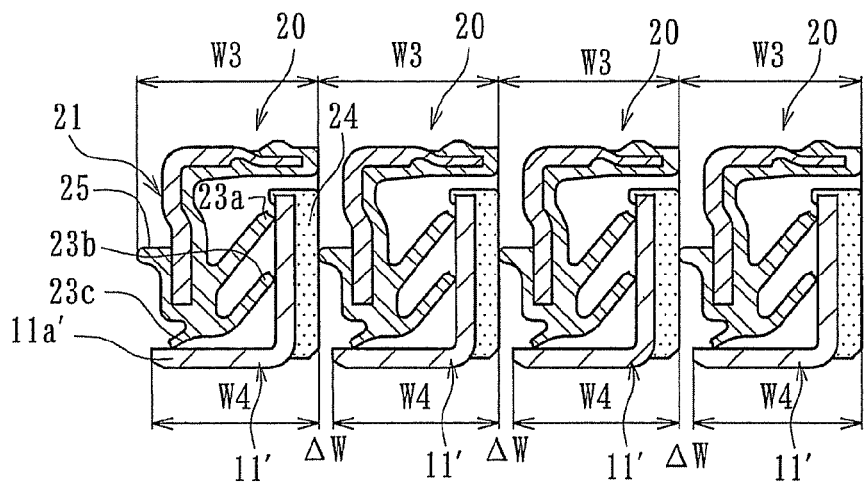

[Fig 9]
(a)
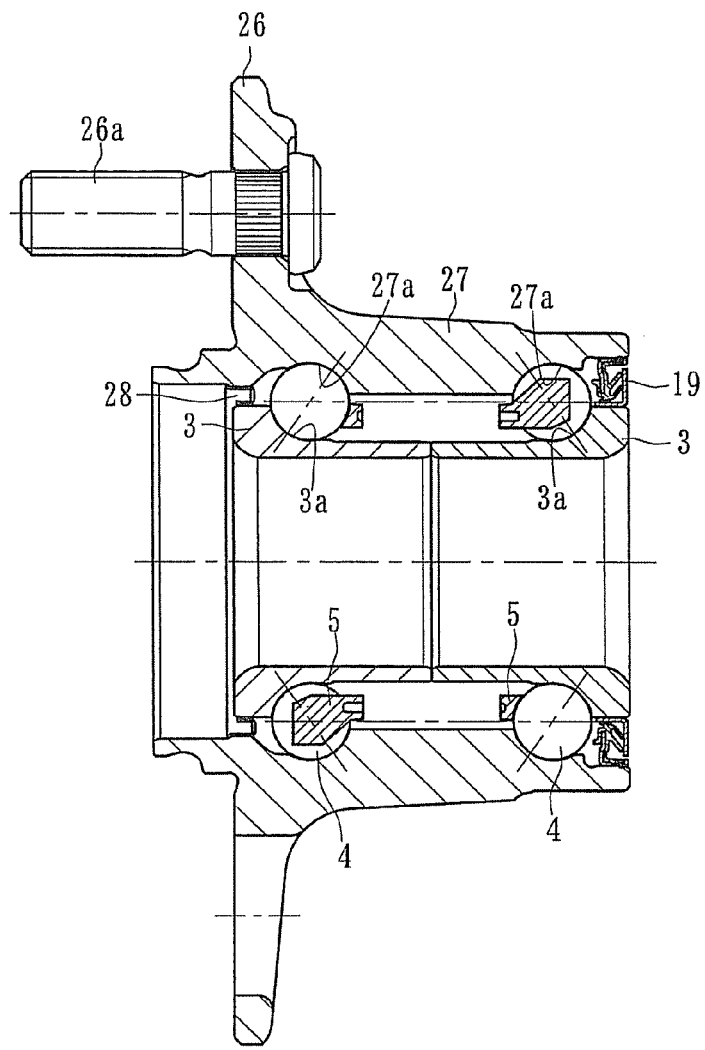
(b)
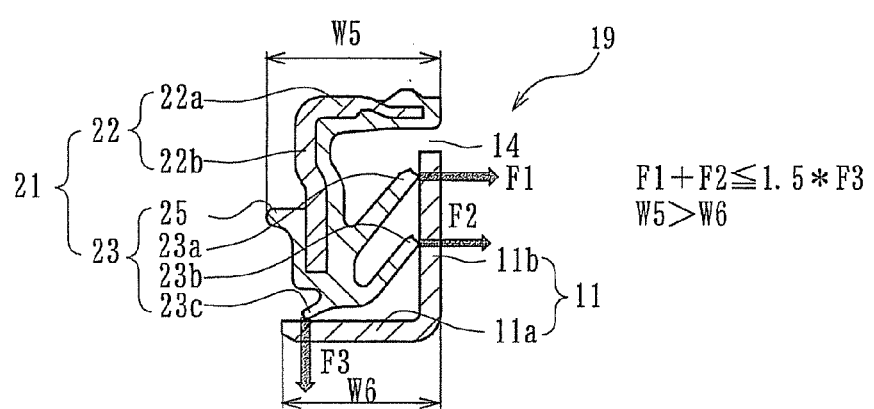
$F1+F2 \leq 1.5 * F3$
$W5 > W6$

[Fig 10]
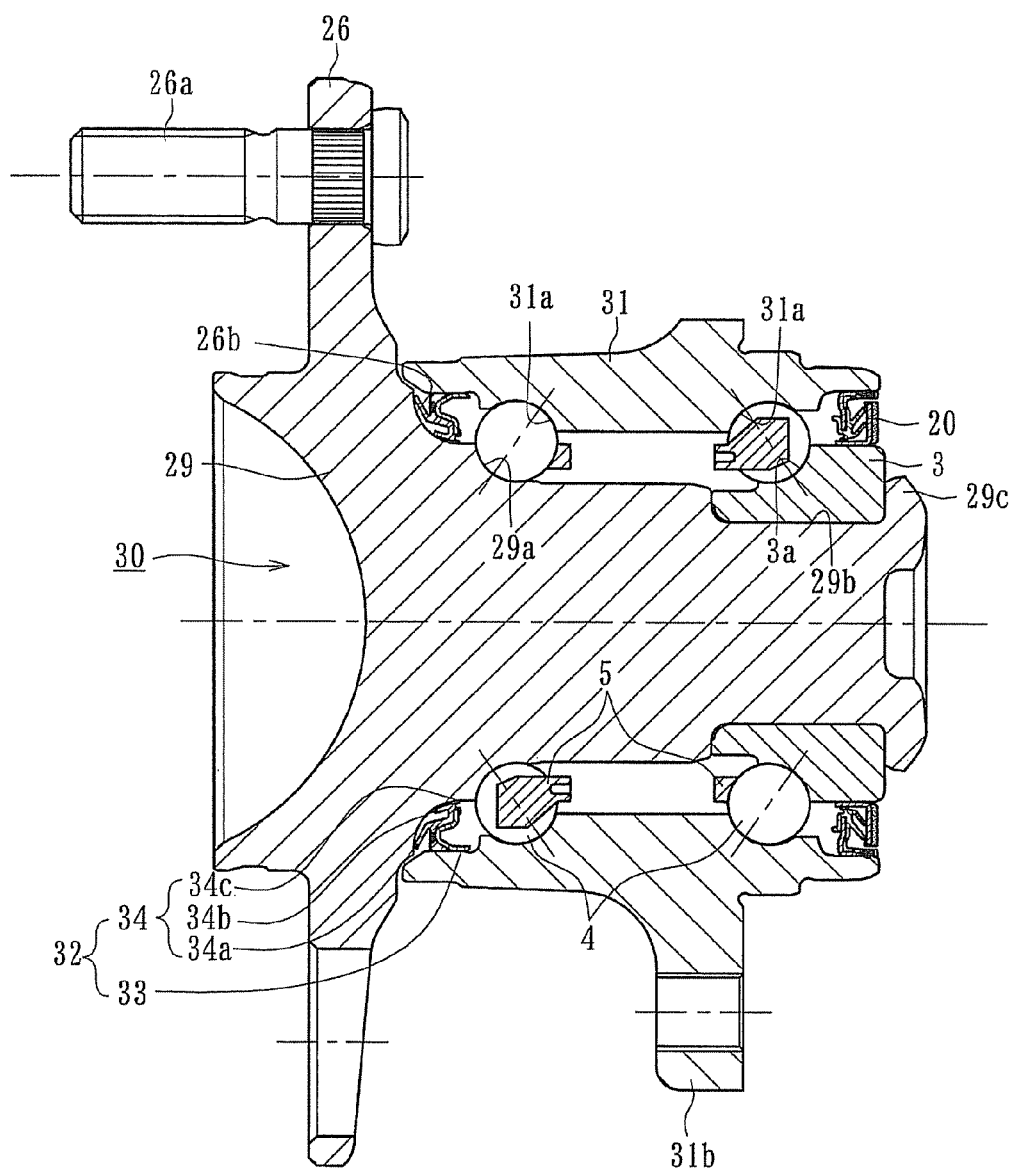

[Fig 11]
PRIOR ART
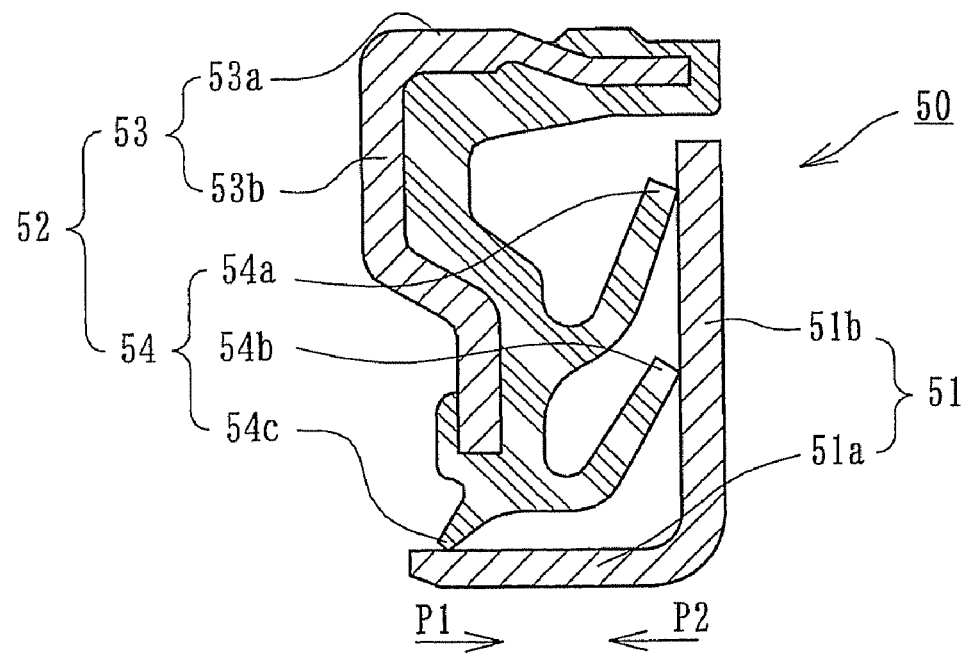

WHEEL BEARING SEAL AND A WHEEL BEARING APPARATUS PROVIDED WITH THE WHEEL BEARING SEAL

CROSS-REFERENCE TO RELATED APPLICATIONS

This application is a continuation of International Application No. PCT/JP2010/000012, filed Jan. 5, 2010, which claims priority to Japanese Application No. 2009-001354, filed Jan. 7, 2009. The disclosures of the above applications are incorporated herein by reference.

FIELD

The present disclosure relates to a wheel bearing seal and, more particularly, to a pack seal with an improved sealing performance against muddy water that can reduce rotational torque while reducing a sliding resistance and also improve the reliability by preventing separation of a seal combined as a unit prior to assembly onto a wheel bearing apparatus.

BACKGROUND

Wheel bearing apparatus, that supports a wheel of a vehicle that freely rotationally supports a wheel hub to mount a wheel, via a double row rolling bearing, are utilized for driving wheels and driven wheels. For structural reasons, the inner ring rotation type is used for driving wheels and both the inner ring rotation type and the outer ring rotation type are used for driven wheels. There are four generation types of wheel bearing apparatus. The first generation type has a wheel bearing including a double row angular contact ball bearing fit between a knuckle, forming part of a suspension apparatus, and a wheel hub. The second generation type has a body mounting flange or a wheel mounting flange that is directly formed on the outer circumference of an outer member. The third generation type has one inner raceway surface directly formed on the outer circumference of a wheel hub. The fourth generation type has inner raceway surfaces formed on the outer circumferences of a wheel hub and an outer joint member, respectively.

In the bearing portion, seals are mounted to prevent leakage of lubricating grease sealed within the bearing and the entry of rain water or dust into the bearing from the outside. Recently, a wheel bearing intended to reduce the rotational torque to improve the fuel consumption has been developed. In the rotational torque, the ratio of the wheel bearings seal is high. That is, the sliding resistance is larger than the rolling resistance in the wheel bearing. Thus, it is desired to further reduce the rotational torque in the wheel bearing seal. In addition, it has been found, after verification of damages of recovered bearings, that the main causes for damaging the wheel bearings are due to defects in sealing rather than peeling of structural elements of the bearing. Accordingly it is believed that the operational life of the bearing can be extended by improving the sealability and durability of the seals of the bearings.

Various seals to improve sealability have been proposed. One representative example of a wheel bearing seal is shown in FIG. 11. The seal 50 includes a slinger 51 and an annular sealing plate 52 arranged opposite to each other. The slinger 51 is made of preserved steel sheet such as an austenitic-stainless steel sheet (JIS SUS 304 etc.). It is formed with a substantially L-shaped cross-section by a press process. The slinger 51 has a cylindrical portion 51a press fit onto the inner ring (not shown) to form a rotational side member. An upstanding portion 51b extends radially outwardly from the cylindrical portion 51a.

The sealing plate 52 is formed with a substantially L-shaped cross-section. The sealing plate 52 is adapted to be mounted on an outer member forming a stationary member. The sealing plate 52 includes a metal core 53 and a sealing member 54 integrally adhered to the metal core 53 by vulcanized adhesion. The metal core 53 is made of preserved steel sheet such as an austenitic-stainless steel sheet. The metal core 53 includes a cylindrical portion 53a adapted to be fit into the end of the outer member and an upstanding portion 53b that extends radially inward from the cylindrical portion 53a.

The sealing member 54 is formed from elastic material such as nitrile rubber etc. The sealing member 54 has first and second side lips 54a, 54b that contact with the upstanding portion 51b. The first and second side lips 54a, 54b are inclined radially outward from the upstanding portion 53b of the metal core 53. The side lips 54a, 54b are adapted to be in contact with the upstanding portion 51b of the slinger 51 with a predetermined interference (contacting loads). The provision of two side lips 54a, 54b provides sealability even if a conventional dust lip is eliminated.

In addition, the sealing member 54 is formed so that it extends both to the outer surface of the cylindrical portion 53a and the inner circumferential edge of the upstanding portion 53b of the metal core 53. This improves the sealability. A grease lip 54c projects toward the cylindrical portion 51a of the slinger 51. The tip of the grease lip 54c has a predetermined fastening force against the cylindrical portion 51a of the slinger 51.

The seal 50 is designed so that it has the following relationship between the fastening force P1 (i.e. a contacting load of the grease lip 54c) against the cylindrical portion 51a of the slinger 51 and the contacting load P2 (i.e. total of the contacting loads of both the side lips 54a, 54b) of the first and second side lips 54a, 54b.

$$P1 \geq P2 \quad \text{(Relational Expression)}$$

That is, the fastening force P1 of the grease lip 54c is set equal to or larger than the contacting load P2 of the first and second side lips 54a, 54b. The contacting load P2 is a force acting to separate the sealing plate 52 from the slinger 51. The fastening force P1 of the grease lip 54c is a force acting to resist against the contacting load P2 acting to separate the sealing plate 52 from the slinger 51. Accordingly, it is possible to prevent the separation of the sealing plate 52 from the slinger 51 by setting the fastening force P1 and the contacting load P2 to have the Relational Expression defined above.

Accordingly, it is possible to assemble the seal 50, formed as a unit of the sealing plate 52 and the slinger 51, into a wheel bearing without the need to separately assemble them into the wheel bearing. Thus, it is possible to improve the efficiency and workability during assembling of the seal 50 into the wheel bearing. See, Patent document 1: Japanese Laid-open Patent Publication No. 2007-211791.

However, in the prior art seal 50, if the fastening force P1 of the grease lip 54c is set too large, it is believed that not only the rotational torque of bearing is increased but also the durability of the bearing is detracted due to an increase of the bearing temperature caused by friction at the grease lip 54c.

SUMMARY

It is, therefore, an object of the present disclosure to provide a wheel bearing seal and a wheel bearing apparatus with the wheel bearing seal that can improve reliability while reducing the rotational torque by reducing the sliding resistance of the seal. This also improves the assembling efficiency and workability of the seal onto the wheel bearing by preventing separation of the combined seal prior to assembly of the seal onto the wheel bearing.

To achieve an object of the present disclosure, a wheel bearing seal is provided. The wheel bearing seal is adapted to be mounted in an annular space opening formed between an outer member and an inner member. The outer member is integrally formed, on its inner circumference, with double row outer raceway surfaces. The inner member is integrally formed, on its outer circumference, with double row inner raceway surfaces arranged within the outer member, via double row rolling elements. The seal, formed as a combined type seal, comprises an annular sealing plate and a slinger arranged opposite to each other. The sealing plate includes a metal core and a sealing member integrally adhered to the metal core by vulcanized adhesion. The sealing member is integrally formed with radially outwardly inclined first and second side lips. The sealing member also includes a radially inwardly inclined grease lip. The slinger has a substantially L-shaped cross-section. The slinger has a cylindrical portion, adapted to be fit onto the outer circumference of the end of the inner member, and an upstanding portion, that extends radially outward from the cylindrical portion. The first and second side lips are in sliding contact with the upstanding portion, via a predetermined axial interference. The grease lip is in sliding contact with the cylindrical portion, via a predetermined radial interference. There is a relationship, $F1+F2 \leqq 1.5 \times F3$, that exists between the contacting loads $F1$ and $F2$, respectively, of the first and second side lips and a fastening force $F3$ of the grease lip.

The wheel bearing seal is adapted to be mounted in an annular space opening formed between an outer member and an inner member. The outer member is integrally formed, on its inner circumference, with double row outer raceway surfaces. The inner member is integrally formed, on its outer circumference, with double row inner raceway surfaces arranged within the outer member, via double row rolling elements. The seal is formed as a combined type seal. The seal includes an annular sealing plate and a slinger arranged opposite to each other. The sealing plate includes a metal core and a sealing member integrally adhered to the metal core by vulcanized adhesion. The sealing member is integrally formed with radially outwardly inclined first and second side lips. Also, the sealing member has a radially outwardly inclined grease lip. The slinger has a substantially L-shaped cross-section. The slinger has a cylindrical portion, adapted to be fit onto the outer circumference of the end of the inner member, and an upstanding portion that extends radially outward from the cylindrical portion. The first and second side lips slidably contact with the upstanding portion, via a predetermined axial interference. The grease lip slidably contacts the cylindrical portion, via a predetermined radial interference. A relationship, $F1+F2 \leqq 1.5 \times F3$, exists between contacting loads $F1$ and $F2$, respectively, of the first and second side lips and a fastening force $F3$ of the grease lip. Thus, it, is possible to provide a wheel bearing seal that can improve its reliability while reducing the rotational torque by reducing the sliding resistance of the seal. This also improves the assembling efficiency and workability of the seal onto the wheel bearing by preventing the separation of the combined seal prior to assembly of the seal onto the wheel bearing.

The grease lip is arranged so that it does not drop off from the cylindrical portion of the slinger even if the slinger is moved by the reactive force of the contacting loads under a combined condition of the sealing plate and the slinger. This makes it possible to surely prevent the separation of the seal, separation of the sealing plate from the slinger.

The radially outer end face of the sealing plate and the side surface of inner side of the upstanding portion of the slinger are arranged so that they are flush with each other. The width of the sealing plate is set larger than the width of the slinger. This makes it possible to simultaneously press-fit both the sealing plate and the slinger into a space between the outer member and the inner ring while keeping a predetermined interference (contacting load) during assembly of the seal into the wheel bearing. In addition, since the width of the sealing plate is set larger than the width of the slinger, it is possible to keep a gap between adjacent slingers when several seal units are vertically stacked during transportation or during assembling steps into the wheel bearing of seals. Accordingly, it is possible to prevent the seal first and second side lips, positioned at a low position near bottom, from being excessively deformed by their own weight. Thus, this prevents the grease lip from dropping off from the cylindrical portion of the slinger.

A magnetic encoder is integrally adhered to the side surface of an inner side of the upstanding portion of the slinger. The magnetic poles N and S are alternately formed equidistantly along the periphery of the magnetic encoder. The encoder is formed by mingling magnetic powder with an elastomer. The radially outer end face of the sealing plate and the side surface of an inner side of the magnetic encoder are arranged so that they are flush with each other. This makes it possible to simultaneously press-fit both the sealing plate and the slinger into a space between the outer member and the inner ring while keeping a predetermined interference during assembly of the seal into the wheel bearing. Also, it is possible to accurately set an air gap between the encoder and a rotational speed sensor.

The width of the sealing plate is set larger than the width of the slinger including the magnetic encoder. This makes it possible to keep a gap between adjacent slingers, including the magnetic encoders, when several seal units are vertically stacked during transportation or during assembling steps into the wheel bearing of seals. Accordingly, it is possible to prevent the grease lip from dropping off from the cylindrical portion of the slinger by adhesion of magnetic force.

The thickness of the first side lip of the radially outer side is set larger than the second side lip of the radially inner side. According to this structure, the contacting load of the first side lip becomes larger than that of the second side lip. Thus, it is possible to improve the durability against muddy water and to reduce the rotational torque while reducing the total sliding resistance.

A straight portion is formed between the first side lip and the second side lip. The distance between the first side lip and the second side lip is set so that the first and second side lips do not interfere with each other when they are deformed at their maximum interference. This makes it possible that the first and second side lips can deform independently of each other without one side lip being influenced by the other side lip.

The sealing member is formed of synthetic rubber and its TR 10 is set lower than −35° C. or less. This makes it possible to maintain the follow-up ability of the lips even in low temperature circumstances and accordingly to exhibit durability against muddy water.

An infinite number of dimples, of a surface roughness Rz 2 to 4, are formed on a surface of the slinger. Grease is previously applied on the lips. This easily forms an oil film between each lip and the slinger. Thus, this reduces the sliding resistance of the seal and accordingly, the rotational torque and wear of the lips.

A wheel bearing apparatus comprises an outer member and an inner member. The outer member is formed, on its outer circumference, with a body mounting flange to be mounted on a knuckle of a vehicle. The outer member inner circumference includes double row outer raceway surface. The inner member includes a wheel hub and an inner ring. The wheel hub is formed, on its one end, with a wheel mounting flange. The wheel hub outer circumference includes an inner raceway surface arranged opposite to one of the double row outer raceway surfaces. A cylindrical portion axially extends from the inner raceway surface. The inner ring is fit onto the cylindrical portion of the wheel hub. The inner ring is formed, on its outer circumference, with an inner raceway surface arranged opposite to the other of the double row outer raceway surfaces. Double row rolling elements are freely rollably contained between the outer and inner raceway surfaces of the outer and inner members, via cages. Wheel bearing seals are mounted within annular openings formed between the outer and the inner members. The inner side seal of the wheel bearing seals comprises any one of the above defined wheel bearing seals.

In a wheel bearing apparatus of a third generation structure, since the inner ring is press-fit onto the wheel hub and immovably secured, it is possible to exhibit effects of the present disclosure that the seal can be assembled by simultaneously press-fitting both the sealing plate and the slinger into a space between the outer member and the inner ring while keeping a predetermined interference during assembly of the seal onto the wheel bearing.

The wheel bearing seal of the present disclosure is adapted to be mounted in an annular space opening formed between an outer member and an inner member. The outer member is integrally formed, on its inner circumference, with double row outer raceway surfaces. The inner member is integrally formed, on its outer circumference, with double row inner raceway surfaces arranged within the outer member, via double row rolling elements. The seal is formed as a combined type seal and comprises an annular sealing plate and a slinger, arranged opposite to each other. The sealing plate includes a metal core and a sealing member integrally adhered to the metal core by vulcanized adhesion. The sealing member is integrally formed with a radially outwardly inclined first and second side lips. Also, the sealing member includes a radially inwardly inclined grease lip. The slinger has a substantially L-shaped cross-section. The slinger includes a cylindrical portion and an upstanding portion. The cylindrical portion is adapted to be fit onto the outer circumference of the end of the inner member. The upstanding portion extends radially outward from the cylindrical portion. The first and second side lips slidably contact with the upstanding portion, via a predetermined axial interference. The grease lip slidably contacts the cylindrical portion, via a predetermined radial interference. The relationship, $F1+F2 \leq 1.5 \times F3$, exists between contacting loads $F1$ and $F2$, respectively, of the first and second side lips and a fastening force $F3$ of the grease lip. Thus, it is possible to provide a wheel bearing seal that can improve reliability while reducing the rotational torque by reducing the sliding resistance of the seal. Also, it improves the assembling efficiency and workability of the seal onto the wheel bearing by preventing separation of the combined seal prior to assembly of the seal onto the wheel bearing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a first embodiment of a wheel bearing.

FIG. 2 is an enlarged sectional view of the wheel bearing seal.

FIG. 3 is a view like FIG. 2 of an explanatory view of an action of the seal.

FIG. 4 is a cross sectional explanatory view of a stacked condition of several seals of FIG. 2.

FIG. 5 is an enlarged sectional view of a modification of the seal of FIG. 2.

FIG. 6 is a longitudinal section view of a second embodiment of a wheel bearing.

FIG. 7 is an enlarged sectional view of the wheel bearing seal.

FIG. 8 is a cross sectional explanatory view of a stacked condition of several seals of FIG. 7.

FIG. 9(*a*) is a longitudinal section view of a third embodiment of a wheel bearing.

FIG. 9(*b*) is an enlarged cross sectional view of a unit seal of FIG. 9 (*a*).

FIG. 10 is a longitudinal section view of a fourth embodiment of a wheel bearing.

FIG. 11 is a longitudinal section view of a prior art wheel bearing seal.

DETAILED DESCRIPTION

A wheel bearing seal is adapted to be mounted in an annular space opening formed between an outer member and an inner member. The outer member is integrally formed, on its inner circumference, with double row outer raceway surfaces. The inner member is integrally formed, on its outer circumference, with double row inner raceway surfaces arranged within the outer member, via double row rolling elements. The seal is formed as a combined type seal comprising an annular sealing plate and a slinger, arranged opposite to each other. The sealing plate includes a metal core and sealing member integrally adhered to the metal core by vulcanized adhesion. The sealing member is integrally formed with radially outwardly inclined first and second side lips. Also, the sealing member includes a radially inwardly inclined grease lip. The slinger has a substantially L-shaped cross-section with a cylindrical portion and an upstanding portion. The cylindrical portion is adapted to be fit onto the outer circumference of the end of the inner member. The upstanding portion extends radially outward from the cylindrical portion. The first and second side lips slidably contact the upstanding portion, via a predetermined axial interference. The grease lip slidably contacts the cylindrical portion, via a predetermined radial interference. The radially outer end face of the sealing plate and the side surface of inner side of the upstanding portion of the slinger are arranged so that they are flush with each other. The width of the sealing plate is set larger than the width of the slinger. A relationship, $F1+F2 \leq 1.5 \times F3$, exist between contacting loads $F1$ and $F2$, respectively, of the first and second side lips and a fastening force $F3$ of the grease lip. The grease lip is arranged so that it does not drop off from the cylindrical portion of the slinger even if the slinger is moved by the reactive force of the contacting loads under a combined condition of the sealing plate and the slinger.

Embodiments of the present disclosure will be hereinafter described with reference to the drawings.

FIG. 1 is a longitudinal section view of a first embodiment of a wheel bearing. FIG. 2 is an enlarged sectional view of the wheel bearing seal. FIG. 3 is a cross-sectional explanatory view of an action of the seal of FIG. 2. FIG. 4 is a cross-sectional explanatory view of a stacked condition of several seals of FIG. 2. FIG. 5 is an enlarged sectional view of a modification of the seal of FIG. 2. In the description below, the term "outer side" of the wheel bearing apparatus denotes a side positioned outside of the vehicle body when the wheel bearing apparatus is mounted on a vehicle (left side in FIG. 1). The term "inner side" denotes a side positioned inside of the vehicle body (right side in FIG. 1).

The wheel bearing 1 in FIG. 1 is a so-called first generation type. It includes an outer member 2 and a pair of inner rings 3, 3. The outer member is integrally formed, on its inner circumference, with double row outer raceway surfaces 2a, 2a. The pair of inner rings 3, 3 is each formed, on its outer circumference, with an inner raceway surface 3a corresponding to each of the double row outer raceway surfaces 2a, 2a. A plurality of rolling elements (balls) 4, 4 is contained between the outer and inner raceway surfaces. Cages 5, 5 rollably hold the rolling elements 4, 4. Seals 6, 7 are mounted in annular space openings formed between the outer member 2 and the inner rings 3, 3.

The outer member 2 is made of high carbon chrome bearing steel such as SUJ2 (JIS G 4805) or blister steel. The high carbon chrome bearing steel is dip hardened at a temperature of 820° to 860° C. and then tempered at a temperature of 160° to 200° C. to have a core hardness of 58 to 64 HRC. On the other hand, the blister steel is hardened to have a surface hardness of 58 to 64 HRC. Similarly to the outer member 2, the inner rings 3, 3 are also made of high carbon chrome bearing steel or blister steel. The high carbon chrome bearing steel is hardened to have a core hardness of 58 to 64 HRC. The blister steel is hardened to have a surface hardness of 58 to 64 HRC. In addition, the rolling elements 4 are also made of high carbon chrome bearing steel such as SUJ2 (JIS G 4805). The rolling elements 4 are dip hardened to have a core hardness of 58 to 64 HRC.

The wheel bearing 1 is formed as a double row angular contact ball bearing of a so-called back-to-back duplex type bearing with smaller diameter (front side) end faces 3b, 3b of the inner ring 3, 3 abutting one another. The seals 6, 7 prevent lubricating grease, contained within the bearing, from leaking to the outside. Also, the seals 6, 7 prevent the entry of rain water or dust from the outside.

The outer side seal 6 of the seals 6, 7 is formed as an integrated seal. The outer seal 6 includes a metal core 8 press-fit into the outer side end of the outer member 2 to form a stationary member, via a predetermined interference. A sealing member 9 is adhered to the metal core 8.

The inner side seal 7 is formed, as shown in the enlarged view of FIG. 2, as a combined seal, a so-called pack seal. The inner side seal 7 includes an annular sealing plate 10 and a slinger 11. They are arranged opposite to each other. The sealing plate 10 includes a metal core 12 adapted to be mounted on the outer member 2. A sealing member 13 is integrally adhered to the metal core 12 by vulcanized adhesion.

The metal core 12 is made of preserved steel sheet such as austenitic-stainless steel sheet (JIS SUS 304 etc.) or preserved cold rolled steel sheet (JIS SPCC etc.). The metal core 12 is formed with a generally L-shaped cross-section, by a press process. The metal core 12 includes a cylindrical fitting portion 12a, having a thin end of a smaller diameter, and a radially inner portion 12b that extends radially inward from the fitting portion 12a. The cylindrical fitting portion 12a is adapted to be press-fit into the outer member 2.

The sealing member 13 is made of synthetic rubber such as NBR (acrylonitrile-butadiene rubber). The sealing member 13 includes first and second side lips 13a, 13b. The side lips 13a, 13b are inclined radially outward. Also, the sealing member 13 includes a radially inwardly inclined grease lip 13c. The sealing member 13 is formed so that it extends to both the outer surface of the fitting portion 12a and the inner circumferential edge of the radially inner portion 12b of the metal core 12 to improve sealability. Examples of material for the sealing member 13, other than NBR, include HNBR (hydrogenation acrylonitrile-butadiene rubber), EPM, EPDM (ethylene -propylene rubber), ACM (polyacrylic rubber) superior in heat resistance and chemical resistance, FKM (fluororubber), silicone rubber etc.

The slinger 11 has a substantially L-shaped cross-section. The slinger 11 includes a cylindrical portion 11a, adapted to be fit onto the outer circumference of the inner member 3, and an upstanding portion 11b that extends radially outward from the cylindrical portion 11a. The first and second side lips 13a, 13b slidably contact the upstanding portion 11b, via a predetermined axial interference (contacting load). The grease lip 13c slidably contacts the cylindrical portion 11a, via a predetermined radial interference (fastening force). In addition, a labyrinth seal 14 is formed between the upstanding portion 11b and the sealing plate 10, via a small radial gap.

The radially outer end face, inner side end face, of the sealing plate 10 and the side surface of inner side of the upstanding portion 11 b of the slinger 11 are set so that they are flush with each other. The width W1 of the sealing plate 10 is set larger than the width W2 of the slinger 11 (W1>W2). This makes it possible to simultaneously press-fit both the sealing plate 10 and the slinger 11 into a space between the outer member 2 and the inner ring 3 while keeping a predetermined interference, contacting loads, during assembly of the seal 7 into the wheel bearing. Since the width W1 of the sealing plate 10 is set larger than the width W2 of the slinger 11 (W1cv >W2), it is possible, as shown in FIG. 4, to keep a gap ΔW between adjacent slingers 11 when several seal units are vertically stacked during transportation or are present during an assembling step onto the wheel bearing. Accordingly, it is possible to prevent the first and second side lips 13a, 13b of seals 7, positioned at a low position near the bottom, from being excessively deformed by their own weight. Thus, this prevents the grease lip 13c from dropping off from the cylindrical portion 11a of the slinger 11.

As shown in FIG. 2, a predetermined relationship is set between the contacting loads, (interferences) shown by arrows F1, F2, of the first and second side lips 13a, 13b and the fastening force, (interference) shown by an arrow F3, of the grease lip 13c. That is, the total of the contacting loads F1, F2 of the first and second side lips 13a, 13b is smaller than 1.5 times the fastening force F3 of the grease lip 13c (i.e. F1+F2≦1.5×F3). For example, when the fastening force F3 of the grease lip 13c is designated by 12N, it is set that the total of the contacting loads F1, F2 is 18N or less.

When the total of the contacting loads F1, F2 of the first and second side lips 13a, 13b is set larger than the fastening force F3 of the grease lip 13c, it is appreciated that the slinger 11 is moved as shown in FIG. 3 by the contacting loads F1, F2 of the first and second side lips 13a, 13b. The motion of the slinger 11 is stopped at a position where the total of the contacting loads F1, F2 of the first and second side lips 13a, 13b is balanced with the fastening force F3 (F1+F2=F3). In the present disclosure, lips 13a, 13b, 13c are arranged so that the grease lip 13c never drops off from the cylindrical portion 11a of the slinger 11 even in such a condition. Thus, it is possible to reduce the sliding resistance of the seal 7 and accordingly the rotational torque as well as to prevent the sealing plate 10 and the slinger 11 of the combined seal, the seal unit 7, from being separated. This improves the efficiency and workability of assembly of the seal into the wheel bearing.

The seal 15 shown in FIG. 5 is a modification of seal 7, previously described. Although the seal 15 has basically the same configuration as the seal 7, thicknesses of the first and second side lips 13a, 13b and a distance between the lips 13a, 13b are defined. More particularly the thickness L1 of the first side lip 13a is set larger than the second side lip 13b (L1>L2). The distance L between the first side lip 13a and the second side lip 13b is set so that they do not interfere with each other when they are deformed at their maximum interference. In addition, a straight portion 16 is formed between the first side lip 13a and the second side lip 13b so that one side lip can independently deform without being influenced by the other side lip. Accordingly, since the contacting load of the first side lip 13a is larger than that of the second side lip 13b, it is possible to improve the durability of the seal 15 against muddy water as well as to reduce the rotational torque while reducing the total sliding resistance.

Further according to the present disclosure, TR 10 (index exhibiting the elasticity of rubber) of the seal member 13, which is a temperature for exhibiting low temperature elasticity recovery factor of 10%, is set lower than 35° C. or less. This makes it possible to maintain the elastic recovery ability of the lips even in low temperature circumstances and accordingly, to exhibit durability against muddy water.

FIG. 6 is a longitudinal section view of a second embodiment of the wheel bearing apparatus. FIG. 7 is an enlarged sectional view of the wheel bearing seal. FIG. 8 is a cross-sectional explanatory view of a stacked condition of several seals of FIG. 7. The same reference numerals as those used in the first embodiment (FIG. 1) are also used in this embodiment.

The wheel bearing 17 is a so-called second generation type. It includes an outer member 18 integrally formed, on its outer circumstance, with a body mounting flange 18b that is adapted to be mounted on a knuckle (not shown) of a vehicle. The outer member inner circumference includes double row outer raceway surfaces 18a, 18a. A pair of inner rings 3, 3 is each formed, on its outer circumference, with an inner raceway surface 3a that corresponds to each of the double row outer raceway surfaces 18a, 18a. A plurality of rolling elements (balls) 4, 4 is contained between the outer and inner raceway surfaces. Cages 5, 5 rollably hold the rolling elements 4, 4. Seals 19, 20 are mounted in annular space openings formed between the outer member 18 and the pair of inner rings 3, 3.

The outer member 18 is made of medium carbon steel including carbon of 0.40 to 0.80% by weight such as S53C. At least the double row outer raceway surfaces 18a, 18a are hardened by high frequency induction quenching to have a surface hardness of 58 to 64 HRC.

The seals 19, 20 are basically different from the seals 6, 7 only in absence or presence of a magnetic encoder. Only inner side seal 20 will be described herein and the description of the outer side seal 19 will be omitted.

As shown in the enlarged view of FIG. 7 the seal 20 includes an annular sealing plate 21 and a slinger 11' arranged opposite to each other. The sealing plate 21 includes a metal core 22 adapted to be mounted on the outer member 18. The sealing member 23 is integrally adhered to the metal core 22 by vulcanized adhesion.

The metal core 22 is made of preserved steel sheet such as austenitic-stainless steel sheet (JIS SUS 304 etc.) or preserved cold rolled steel sheet (JIS SPCC etc.). The metal core 22 is formed to have a generally L-shaped cross-section by a press process. The metal core 22 includes a cylindrical fitting portion 22a with a thin end of smaller diameter, and a radially inner portion 22b that extends radially inward from the fitting portion 22a.

The sealing member 23 is made of synthetic rubber such as NBR etc. The sealing member 23 includes radially outwardly inclined first and second side lips 23a, 23b. Also, the sealing member 23 includes a radially inwardly inclined grease lip 23c. In addition, the sealing member 23 is formed so that it extends to both the outer surface of the fitting portion 22a and to the inner circumferential edge of the radially inner portion 22b of the metal core 22 to improve sealability.

The first and second side lips 23a, 23b slidably contact the upstanding portion 11b' of the slinger 11', via a predetermined axial interference (contacting load). The grease lip 23c slidably contacts the cylindrical portion 11a', via a predetermined radial interference (fastening force). A magnetic encoder 24 is integrally adhered to the side surface of inner side of the upstanding portion 11b' of the slinger 11'. Magnetic poles N and S are alternately formed equidistantly along the periphery of the magnetic encoder 24. The magnetic encoder 24 is formed by mingling magnetic powder with elastomer to form a rotary encoder to detect the rotational speed of the wheel.

The radially outer end face of the sealing plate 21 and the side surface of inner side of the magnetic encoder 24 are arranged so that they are flush with each other. In addition, a tongue 25 of the sealing member 23, projecting toward the outer side of the bearing, is formed on the metal core 23. The width W3 of the sealing plate 21 is set so that it is larger than the width W4 of the slinger 11' including the magnetic encoder 24 (W3>W4). This makes it possible to simultaneously press-fit both the sealing plate 21 and the slinger 11' into a space between the outer member 18 and the inner ring 3 while keeping a predetermined interference during assembly of the seal into the wheel bearing and also possible to accurately set an air gap between the encoder and a rotational speed sensor (not shown).

It is possible, as shown in FIG. 8, to keep a gap ΔW between adjacent slingers 11', 11' when several seal units 20 are vertically stacked during transportation or during the assembling step, into the wheel bearing, of the seals. Accordingly, it is possible to prevent the grease lip 23c from dropping off from the cylindrical portion 11a' of the slinger 11' by adhesion of magnetic force.

As shown in FIG. 7, similarly to the previously described embodiment, the total of contacting loads F1, F2 of the first and second side lips 23a, 23b is set smaller than 1.5 times the fastening force F3 of the grease lip 23c (F1+F2≦1.5×F3). Thus, it is possible to reduce the sliding resistance of the seal 20 and accordingly the rotational torque. Also, it is possible to prevent the sealing plate and the slinger of the combined seal, seal unit 20, from being separated. This improves the efficiency and workability of assembly of the seal 20 into the wheel bearing.

An infinite number of micro dimples (not shown) are formed by shot peening on the surface of the slinger 11'. Grease is previously applied on each lip. The irregularity of dimples is set so that it is within a range of a surface roughness Rz 2 to 4. This enables an easy formation of an oil film between each lip and the slinger 11'. Thus, this reduces the sliding resistance of the seal and, accordingly, the rotational torque and wear of the lips. In addition, the securing ability of the magnetic encoder 24 can be enhanced by forming the dimples. "Rz" means the ten point average roughness of the roughness shape parameter of JIS (JIS B0601-1994). The dimples may be formed on the surface of each lip by appropriately selecting the formation of synthetic rubber.

FIG. 9(*a*) is a longitudinal section view of a third embodiment of a wheel bearing apparatus. FIG. 9(*b*) is an enlarged cross-sectional view of a unit of seal of FIG. 9 (*a*). The same reference numerals as those used in the previous embodiments are also used in this embodiment to identify the same elements.

This wheel bearing apparatus is a second generation outer ring rotation type used for a driven wheel. It includes an outer member 27 integrally formed, on its outer circumstance, with a wheel mounting flange 26. The outer member inner circumference includes double row outer raceway surfaces 27*a*, 27*a*. A pair of inner rings 3, 3 is each formed, on its outer circumference, with an inner raceway surface 3*a* that corresponds to each of the double row outer raceway surfaces 27*a*, 27*a*. Double row rolling elements 4, 4 are contained between the outer and inner raceway surfaces. Cages 5, 5 rollably hold the rolling elements 4, 4. A shield 28 and a seal 19 are mounted in annular space openings formed between the outer member 27 and the pair of inner rings 3, 3. Hub bolts 26*a* are mounted equidistantly on the wheel mounting flange 26 along its periphery.

The outer member 27 is made of medium carbon steel including carbon of 0.40 to 0.80% by weight such as S53C. At least the double row outer raceway surfaces 27*a*, 27*a* are hardened by high frequency induction quenching to have a surface hardness of 58 to 64 HRC.

The seal 19 is formed by a pack seal and includes an annular sealing plate 21 and a slinger 11 arranged opposite to each other. The sealing plate 21 includes a metal core 22, adapted to be mounted on the outer member 27, and a sealing member 23 integrally adhered to the metal core 22 by vulcanized adhesion. The sealing member 23 includes a radially outwardly inclined first and second side lips 23*a* 23*b*. The first and second side lips 23*a*, 23*b* contact the upstanding portion 11*b* of the slinger 11, via a predetermined axial interference (contacting load). The sealing member 23 includes a radially inwardly inclined grease lip 23*c*. The grease lip 23*c* contacts the cylindrical portion 11 a of the slinger 11, via a predetermined radial interference.

The radially outer end face, inner side end face, of the sealing plate 21 and the side surface of inner side of the upstanding portion 11*b* of the slinger 11 are set so that they are flush with each other. The sealing member 23 is formed with a tongue 25 that project toward the outer side from the radially inner portion of the metal core 23. The width W5 of the sealing plate 21 is set larger than the width W6 of the slinger 11 (W5>W6). This makes it possible to simultaneously press-fit both the sealing plate 21 and the slinger 11 into a space between the outer member 27 and the inner ring 3 while keeping a predetermined interference during assembly of the seal into the wheel bearing. Since the width W5 of the sealing plate 21 is set larger than the width W6 of the slinger 11 (W5>W6), when several seal units are vertically stacked during transportation or during an assembling step, into the wheel bearing, of the seals, it is possible to prevent the first and second side lips 23*a*, 23*b* of the seals 19, positioned at a low position near bottom, from being excessively deformed by their own weight. Thus, this prevents the grease lip 23*c* from dropping off from the cylindrical portion 11*a* of the slinger 11.

According to this embodiment, since the outer member 27, formed with the wheel mounting flange 26, is rotated, the contacting forces F1, F2 of the first and second side lips 23*a*, 23*b* and the fastening force F3 of the grease lip 23*c* are reduced by a centrifugal force caused by the rotation of the outer member 27. However, the total of contacting loads F1, F2 of the two side lips 23*a*, 23*b* is smaller than 1.5 times the fastening force F3 of the grease lip 23*c* (F1+F2≦1.5×F3). Thus, it is possible to reduce the sliding resistance of the seal 19 and, accordingly, the rotational torque. Also, it is possible to prevent the sealing plate and the slinger of the combined seal, seal unit 19, from being separated.

FIG. 10 is a longitudinal section view of a fourth embodiment of a wheel bearing apparatus. The same reference numerals as those used in the previous embodiments are also used in this embodiment to designate like elements and thus their detailed description will be omitted.

This wheel bearing apparatus is a third generation type used for a driven wheel. It includes an inner member 30 with a wheel hub 29 and an inner ring 3 secured onto the wheel hub 29. An outer member 31 is mounted on the inner member 30, via double row rolling elements 4, 4.

The wheel hub 29 is integrally formed on its outer side end with a wheel mounting flange 26. The wheel hub outer circumference includes one, outer side, inner raceway surface 29*a*. A cylindrical portion 29*b* axially extends from the inner raceway surface 29*a*. The inner ring 3 is formed, on its outer circumference, with the other, inner side, inner raceway surface 3*a*. The inner ring 3 is press-fit onto the cylindrical portion 29*b* of the wheel hub 29. The inner ring 3 is axially secured under a predetermined pre-pressured condition by a caulked portion 29*c*. The caulked portion 29*c* is formed by plastically deforming the end of the cylindrical portion 29*b* radially outward.

The wheel hub 29 is made of medium carbon steel including carbon of 0.40 to 0.80% by weight such as S53C. The wheel hub 29 is hardened by high frequency induction quenching to form a region, from a flange base 26*b* of the wheel mounting flange 26, forming a seal land portion of an outer side seal 32 described later, to the cylindrical portion 29*b*, with a surface hardness of 58 to 64 HRC.

The outer member 31 is integrally formed, on its outer circumference with a body mounting flange 31*b* to be mounted on a knuckle (not shown). The outer member inner circumference includes double row outer raceway surfaces 31*a*, 31*a* that correspond to the inner raceway surfaces 29*a*, 3*a* of the inner member 30. Double row rolling elements 4, 4 are rollably contained between the outer raceway surfaces 31*a*, 31*a* and the inner raceway surfaces 29*a*, 3*a* via cages 5.

The outer member 31 is made of medium carbon steel including carbon of 0.40 to 0.80% by weight such as S53C. At least the double row outer raceway surfaces 31*a*, 31*a* are hardened by high frequency induction quenching to have a surface hardness of 58 to 64 HRC.

Seals 32, 20 are mounted within annular openings formed between the outer member 31 and inner member 30. The seals 32, 20 prevent leakage of grease contained in the bearing and entry of rain water and dust into the bearing from the outside.

The outer side seal 32 of the seals 32, 20 is formed as a seal unit. It includes a metal core 33 and a sealing member 34. The metal core 33 is press-fit into the outer side end of the outer member 31 via a predetermined interference. The sealing member 34 is adhered to the metal core 33. The sealing member 34 is made of synthetic rubber, such as NBR etc. The sealing member 34 is integrally adhered to the metal core 33 via vulcanized adhesion. The sealing member 34 includes a side lip 34a and a dust lip 34b both inclined radially outward. Also, the sealing member 34 includes a grease lip 34c that is inclined radially inward.

The inner side base 26b of the wheel mounting flange 26 is formed with a circular arc cross-section. The side lip 34a and dust lip 34b slidingly contact the inner side base 26b via a predetermined interference. The grease lip 34c also contacts the inner side base 26b, via a predetermined radial interference. Examples of the material of the sealing member 34, other than NBR, include HNBR, EPDM (ethylene-propylene rubber), ACM superior in heat resistance and chemical resistance, FKM, silicone rubber etc.

In this embodiment, the inner side seal 20, as previously described, includes an annular sealing plate 21 and a slinger 11' arranged opposite to each other to form a pack seal. The sealing plate 21 includes a metal core 22, adapted to be mounted on the outer member 31, and a sealing member 23 integrally adhered to the metal core 22 via vulcanized adhesion.

Since the width W3 of the sealing plate 21 is set larger than the width W4 of the slinger 11', including the magnetic encoder 24, and the total of the contacting loads F1, F2 of the two side lips 23a, 23b is smaller than 1.5 times the fastening force F3 of the grease lip 23c, it is possible to reduce the sliding resistance of the seal 20 and, accordingly, the rotational torque. Also, it is possible to prevent the sealing plate and the slinger, of the combined seal, seal unit 20, from being separated.

According to the wheel bearing apparatus of the third generation type, the inner ring 3 is axially secured by the caulked portion 29c simultaneously with the assembly of the inner ring 3 to the wheel hub 29. Thus, it is possible to have an excellent effect that the assembly of the seal 20 can be achieved by simultaneously press-fitting the sealing plate 21 and the slinger 11' into a space between the outer member 31 and the inner ring 3 while preventing separation of the seal unit 20 and keeping a predetermined interference before and during assembly of the seal 20 into the wheel bearing.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The seal for a wheel bearing apparatus of the present disclosure can be applied to any of the bearing apparatus of the first, second, and third generations irrespective of the driving wheel or the driven wheel.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing seal adapted to be mounted in an annular space opening formed between an outer member and an inner member including double row rolling elements comprising:
   an annular sealing plate and a slinger arranged opposite to each other;
   the sealing plate including a metal core and a sealing member integrally adhered to the metal core by vulcanized adhesion, the metal core is adapted to fit onto an inner circumference of an end of the outer member, the sealing member including a first side lip, a second side lip, and a grease lip, the first and second side lips are inclined radially outward, the grease lip is inclined radially inward;
   the slinger has a substantially L-shaped cross-section including a cylindrical portion and an upstanding portion, the cylindrical portion is adapted to be fit onto the outer circumference of an end of the inner member, the upstanding portion extends radially outward from the cylindrical portion, the first and second side lips slidably contact the upstanding portion, via a predetermined axial interference, and the grease lip slidably contacts the cylindrical portion via a predetermined radial interference;
   a relationship of the force is $F1+F2 \leqq 1.5 \times F3$ between contacting loads F1 and F2, respectively, of the first and second side lips and a fastening force F3 of the grease lip, wherein F1 and F2 are exerted against the slinger upstanding portion in an axial direction and F3 is exerted against the slinger cylindrical portion in a radial direction.

2. The wheel bearing seal for a wheel bearing of claim 1, wherein the grease lip is arranged so that it does not drop off from the cylindrical portion of the slinger even if the slinger is moved by a reactive force of the contacting loads (F1 and F2) under a combined condition of the sealing plate and the slinger.

3. The wheel bearing seal for a wheel bearing of claim 1, wherein a radially outer end face of the sealing plate and a side surface of inner side of the upstanding portion of the slinger are arranged so that they are flush with each other and a width of the sealing plate is set larger than a width of the slinger.

4. The wheel bearing seal for a wheel bearing of claim 1, wherein a magnetic encoder is integrally adhered to a side surface of an inner side of the upstanding portion of the slinger, wherein magnetic poles N and S are alternately formed equidistantly along a periphery of the magnetic encoder, the magnetic encoder is formed by mingling magnetic powder with elastomer to form the encoder, and a radially outer end face of the sealing plate and the side surface of an inner side of the magnetic encoder are arranged so that they are flush with each other.

5. The wheel bearing seal for a wheel bearing of claim 4, wherein the width of the sealing plate is set larger than the width of the slinger including the magnetic encoder.

6. The wheel bearing seal for a wheel bearing of claim 1, wherein a thickness of the first side lip of the radially outer side is set larger than a second side lip of the radially inner side.

7. The wheel bearing seal for a wheel bearing of claim 1, wherein a straight portion is formed between the first side lip and the second side lip, and wherein a distance between the first side lip and the second side lip is set so that the first and second side lips do not interfere with each other when they are deformed at their maximum interference.

8. The wheel bearing seal for a wheel bearing of claim 1, wherein the sealing member is formed of synthetic rubber and its TR 10 (index exhibiting the elasticity of rubber) is set lower than −35° C. which is the temperature for exhibiting low temperature elasticity recovery factor of 10%.

9. The wheel bearing seal for a wheel bearing of claim 1, wherein a desired number of dimples are formed on a surface of the slinger with a surface roughness Rz 2 to 4 and grease is applied on the lips.

10. A wheel bearing apparatus comprising:
- an outer member formed, on its outer circumference, with a body mounting flange to be mounted on a knuckle of a vehicle, the outer member inner circumference includes double row outer raceway surface;
- an inner member includes a wheel hub and an inner ring, the wheel hub is formed, on its one end, with a wheel mounting flange, the wheel hub outer circumference includes inner raceway surface arranged opposite to one of the double row outer raceway surfaces, a cylindrical portion axially extends from the inner raceway surface, and the inner ring is fit onto the cylindrical portion of the wheel hub, the inner ring outer circumference includes an inner raceway surface arranged opposite to the other of the double row outer raceway surfaces;
- double row rolling elements are freely rollably contained between the outer and inner raceway surfaces of the outer and inner members, via cages;
- wheel bearing seals are mounted within annular openings formed between the outer and the inner members; and
- an inner side seal of the wheel bearing seals comprises wheel bearing seals defined in claim 1.

11. The wheel bearing apparatus of claim 10, wherein the grease lip is arranged so that it does not drop off from the cylindrical portion of the slinger even if the slinger is moved by a reactive force of the contacting loads (F1 and F2) under a combined condition of the sealing plate and the slinger.

12. The wheel bearing apparatus of claim 10, wherein a radially outer end face of the sealing plate and a side surface of inner side of the upstanding portion of the slinger are arranged so that they are flush with each other and a width of the sealing plate is set larger than a width of the slinger.

13. The wheel bearing apparatus of claim 10, wherein a magnetic encoder is integrally adhered to a side surface of an inner side of the upstanding portion of the slinger, wherein magnetic poles N and S are alternately formed equidistantly along a periphery of the magnetic encoder, the magnetic encoder is formed by mingling magnetic powder with elastomer to form the encoder, and a radially outer end face of the sealing plate and the side surface of an inner side of the magnetic encoder are arranged so that they are flush with each other.

14. The wheel bearing apparatus of claim 13, wherein the width of the sealing plate is set larger than the width of the slinger including the magnetic encoder.

15. The wheel bearing apparatus of claim 10, wherein a thickness of the first side lip of the radially outer side is set larger than a second side lip of the radially inner side.

16. The wheel bearing apparatus of claim 10, wherein a straight portion is formed between the first side lip and the second side lip, and wherein a distance between the first side lip and the second side lip is set so that the first and second side lips do not interfere with each other when they are deformed at their maximum interference.

17. The wheel bearing apparatus of claim 10, wherein the sealing member is formed of synthetic rubber and its TR 10 (index exhibiting the elasticity of rubber) is set lower than −35° C. which is the temperature for exhibiting low temperature elasticity recovery factor of 10%.

18. The wheel bearing apparatus of claim 10, wherein a desired number of dimples are formed on a surface of the slinger with a surface roughness Rz 2 to 4 and grease is applied on the lips.

* * * * *

UNITED STATES PATENT AND TRADEMARK OFFICE
CERTIFICATE OF CORRECTION

PATENT NO. : 8,267,591 B2
APPLICATION NO. : 13/177596
DATED : September 18, 2012
INVENTOR(S) : Tomoko Baba et al.

It is certified that error appears in the above-identified patent and that said Letters Patent is hereby corrected as shown below:

In the Specifications:

Column 8
Line 34, "*11* b" should be --*11*b--
Line 43, "(W1cv>W2)" should be --(W1>W2)--

Column 9
Line 32, "35°C." should be --35°C--

Column 10
Line 24, "11 *a*'" should be --11*a*--

Column 13
Line 41-48, Delete the following "The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents."

Signed and Sealed this
Eighth Day of January, 2013

David J. Kappos
*Director of the United States Patent and Trademark Office*